(12) United States Patent
Tan et al.

(10) Patent No.: US 12,276,307 B1
(45) Date of Patent: Apr. 15, 2025

(54) INPUT DRUM ASSEMBLY FOR IMPROVING PERFORMANCE OF 68RFE TRANSMISSION, 68RFE TRANSMISSION, AND METHOD

(71) Applicant: FEDERAL NEW POWER (QINGDAO) CO., LTD., Shandong (CN)

(72) Inventors: Tao Tan, Shandong (CN); Lianlian Yin, Shandong (CN)

(73) Assignee: FEDERAL NEW POWER (QINGDAO) CO., LTD., Shangdong (CN)

( * ) Notice: Subject to any disclaimer, the term of this patent is extended or adjusted under 35 U.S.C. 154(b) by 0 days.

(21) Appl. No.: 18/513,531

(22) Filed: Nov. 18, 2023

(30) Foreign Application Priority Data

Oct. 17, 2023 (CN) .......................... 202311340663.3

(51) Int. Cl.
*F16D 25/0638* (2006.01)
(52) U.S. Cl.
CPC .................. *F16D 25/0638* (2013.01)
(58) Field of Classification Search
CPC .... F16H 13/52; F16H 13/54; F16H 13/72–74; F16H 25/06–0638
See application file for complete search history.

(56) References Cited

U.S. PATENT DOCUMENTS

| | | | | |
|---|---|---|---|---|
| 1,425,094 A | * | 8/1922 | Hudson | F16H 57/031 |
| | | | | 74/606 R |
| 4,240,524 A | * | 12/1980 | Katayama | F16H 57/0434 |
| | | | | 184/6.12 |
| 5,186,693 A | * | 2/1993 | Nishida | F16H 57/08 |
| | | | | 192/48.92 |
| 10,480,592 B1 | * | 11/2019 | Copeland | F16D 13/54 |
| 11,713,788 B2 | | 8/2023 | Copeland et al. | |
| 2021/0372489 A1 | * | 12/2021 | Nader | F16D 25/123 |

FOREIGN PATENT DOCUMENTS

JP     2000193048 A  *  7/2000

\* cited by examiner

*Primary Examiner* — Ernesto A Suarez
*Assistant Examiner* — Lillian T Nguyen
(74) *Attorney, Agent, or Firm* — SZDC Law PC

(57) ABSTRACT

Disclosed are an input drum assembly for improving performance of a 68RFE transmission and a method. The cooling and lubricating efficiencies of the input drum assembly in the 68RFE transmission can be improved by an input drum assembly and/or transmission housing; mounting spaces of clutch plates and clutch friction discs can be increased by the input drum assembly, so that thicknesses of the clutch plates 14 and discs or the number thereof can be increased, and a torque borne by the 68RFE transmission can be increased finally; a reinforcing rib is increased when the transmission housing is cast, so that the overall strength of the transmission housing can be enhanced; and an inner wall is cut after the transmission housing is cast, so that a diameter of the input drum assembly can be increased, thereby increasing diameters of the clutch plates and discs, and finally increasing the torque.

14 Claims, 11 Drawing Sheets

Recessed part     Clamping slot                Clamping slot

INPUT DRUM ASSEMBLY FOR IMPROVING PERFORMANCE OF 68RFE TRANSMISSION, 68RFE TRANSMISSION, AND METHOD

This application claims priority to Chinese Patent Application No. 202311340663.3 filed on Oct. 17, 2023, which is incorporated by reference for all purposes as if fully set forth herein.

TECHNICAL FIELD

The present invention generally relates to the field of vehicle transmissions. In particular, the present invention relates to an input drum assembly for improving performance of a 68RFE transmission, the 68RFE transmission, and a method.

BACKGROUND

A transmission, also referred to as a gearbox, is a mechanism for changing the rotating speed and torque of an engine, and can fix or change a drive ratio of an output shaft to an input shaft in a gear manner. An input drum assembly in a clutch is an important assembly of the transmission. FIG. 2 to FIG. 5 show a traditional input drum assembly 100, including a clutch piston 11, a clutch retainer 12, an underdrive piston 13, clutch plates 14, clutch friction discs 15, an underdrive hold plate 16, an overdrive hold plate 17 and a clutch pressure plate 18. A plurality of clutch plates 14 and clutch friction discs 15 are provided.

During use, a large amount of heat is generated in the input drum assembly due to friction. In a case that the heat cannot be transferred out of the input drum in time, the clutch friction discs 15 are overheated and deformed, and seriously form a wave shape, resulting in that the input drum assembly 100 is always in a semi-clutch state. In this way, slipping and friction of the clutch friction discs 15 will be further aggravated to produce heat. The overheated state will scorch the clutch friction discs 15 and produce a large number of carbon deposits, thereby greatly reducing a friction coefficient and greatly reducing the torque borne by the gearbox. In addition, carbon deposit particles enter other parts along with cooling oil to cause blockage, pressure reduction and poor heat dissipation, thereby shortening the service life of the gearbox in multiples.

The number, thicknesses or diameters of the clutch plates 14 and the clutch friction discs 15 are important factors that affect the torque borne by the input drum assembly. However, in a traditional input drum assembly, due to the structures of the input drum assembly and the transmission housing, the three factors are difficult to change. Therefore, in a case that the performance of the input drum assembly, the clutch or the transmission is required to be improved, it is necessary to improve an existing structure.

SUMMARY

According to one aspect, the present invention relates to an input drum assembly for improving performance of a 68RFE transmission, including a clutch retainer, an underdrive piston, clutch plates, clutch friction discs, an underdrive hold plate and a clutch pressure plate. The input drum assembly further includes a piston cap and a piston body, and bolts for fixedly connecting the piston cap and the piston body, where the underdrive piston, the clutch plates, the clutch friction discs and the underdrive hold plate are arranged in the clutch retainer.

The piston cap is provided with a cap body attached to an end face of the clutch retainer; an edge of the cap body extends circumferentially to form a lip with a certain width and thickness; and the lip is provided with a plurality of through-holes for the insertion of the bolts.

The piston body includes a cylindrical barrel; a plurality of hole slots matched with the bolts and the through-holes are formed in an end face of one end of the barrel close to the piston cap; a hold plate is formed at one end of the barrel away from the piston cap; and the hold plate is provided with a piston body slot.

The piston cap and the piston body which are fixed together are sleeved outside the clutch retainer. Meanwhile, the tab on the clutch retainer passes through the piston body slot on the piston body and is finally in clamping connection with the slot on the clutch pressure plate.

A wall of the barrel of the piston body is provided with a plurality of piston body oil holes; a wall of the clutch retainer is provided with a plurality of retainer oil holes; and the retainer oil holes are in one-to-one correspondence with the piston body oil holes.

According to another aspect, the present invention further relates to a 68RFE transmission, including: a transmission housing, a planetary gear set and an input drum assembly, where the input drum assembly is a new input drum assembly; the new input drum assembly includes a clutch retainer, an underdrive piston, clutch plates, clutch friction discs, an underdrive hold plate and a clutch pressure plate. The 68RFE transmission further includes a piston cap, a piston body, and bolts for fixedly connecting the piston cap and the piston body, where the underdrive piston, the clutch plates, the clutch friction discs and the underdrive hold plate are arranged in the clutch retainer.

The piston cap is provided with a cap body attached to an end face of the clutch retainer; an edge of the cap body extends circumferentially to form a lip with a certain width and thickness; and the lip is provided with a plurality of through-holes for the insertion of the bolts.

The piston body includes a cylindrical barrel; a plurality of hole slots matched with the bolts and the through-holes are formed in an end face of one end of the barrel close to the piston cap; a hold plate is formed at one end of the barrel away from the piston cap; and the hold plate is provided with a piston body slot.

The piston cap and the piston body which are fixed together are sleeved outside the clutch retainer. Meanwhile, the tab on the clutch retainer passes through the piston body slot on the piston body and is finally in clamping connection with the slot on the clutch pressure plate.

A wall of the barrel of the piston body is provided with a plurality of piston body oil holes; a wall of the clutch retainer is provided with a plurality of retainer oil holes; and the retainer oil holes are in one-to-one correspondence with the piston body oil holes.

A wall of the transmission housing is provided with a housing oil filling hole for inputting lubricating oil into the transmission housing, and a housing oil outlet hole for outputting the input lubricating oil from the transmission.

The housing oil filling hole corresponds to the position of the input drum assembly, and the housing oil outlet hole corresponds to the position of the planetary gear set arranged in the transmission housing.

A reinforcing rib penetrating up and down is arranged on an outer wall of the transmission housing.

An inner wall of the transmission housing is cylindrical at the corresponding position of the input drum assembly.

A wall of the transmission housing is provided with a speed detection hole and a second speed detection hole; and a distance between the second speed detection hole in an axial direction and the planetary gear set is greater than a distance between the speed detection hole and the planetary gear set.

In addition, the present invention further relates to a method for improving performance of a 68RFE transmission. A new input drum assembly is used in the 68RFE transmission; the new input drum assembly includes a clutch retainer, an underdrive piston, clutch plates, clutch friction discs, an underdrive hold plate and a clutch pressure plate; the new input drum assembly further includes a piston cap, a piston body and bolts for fixedly connecting the piston cap and the piston body; and the underdrive piston, the clutch plates, the clutch friction discs and the underdrive hold plate are arranged in the clutch retainer;

or after an input drum assembly in the 68RFE transmission is disassembled, a clutch piston, an overdrive hold plate and a snap ring are replaced with a piston cap and a piston body; then, an underdrive piston, clutch plates, clutch friction discs and an underdrive hold plate are arranged in a clutch retainer and are mounted between the piston cap and the piston body; and finally, the piston cap and the piston body are fixedly connected by bolts.

A new transmission housing is replaced; and a wall of the new transmission housing is provided with a housing oil filling hole for inputting lubricating oil into the transmission housing, and a housing oil outlet hole for outputting the input lubricating oil from the transmission.

The housing oil filling hole corresponds to the position of the input drum assembly, and the housing oil outlet hole corresponds to the position of the planetary gear set arranged in the transmission housing.

An inner wall of the transmission housing is cylindrical at the corresponding position of the input drum assembly.

A wall of the transmission housing is provided with a speed detection hole and a second speed detection hole; and a distance between the second speed detection hole in an axial direction and the planetary gear set is greater than a distance between the speed detection hole and the planetary gear set.

DESCRIPTION OF EMBODIMENTS

Figure 1:
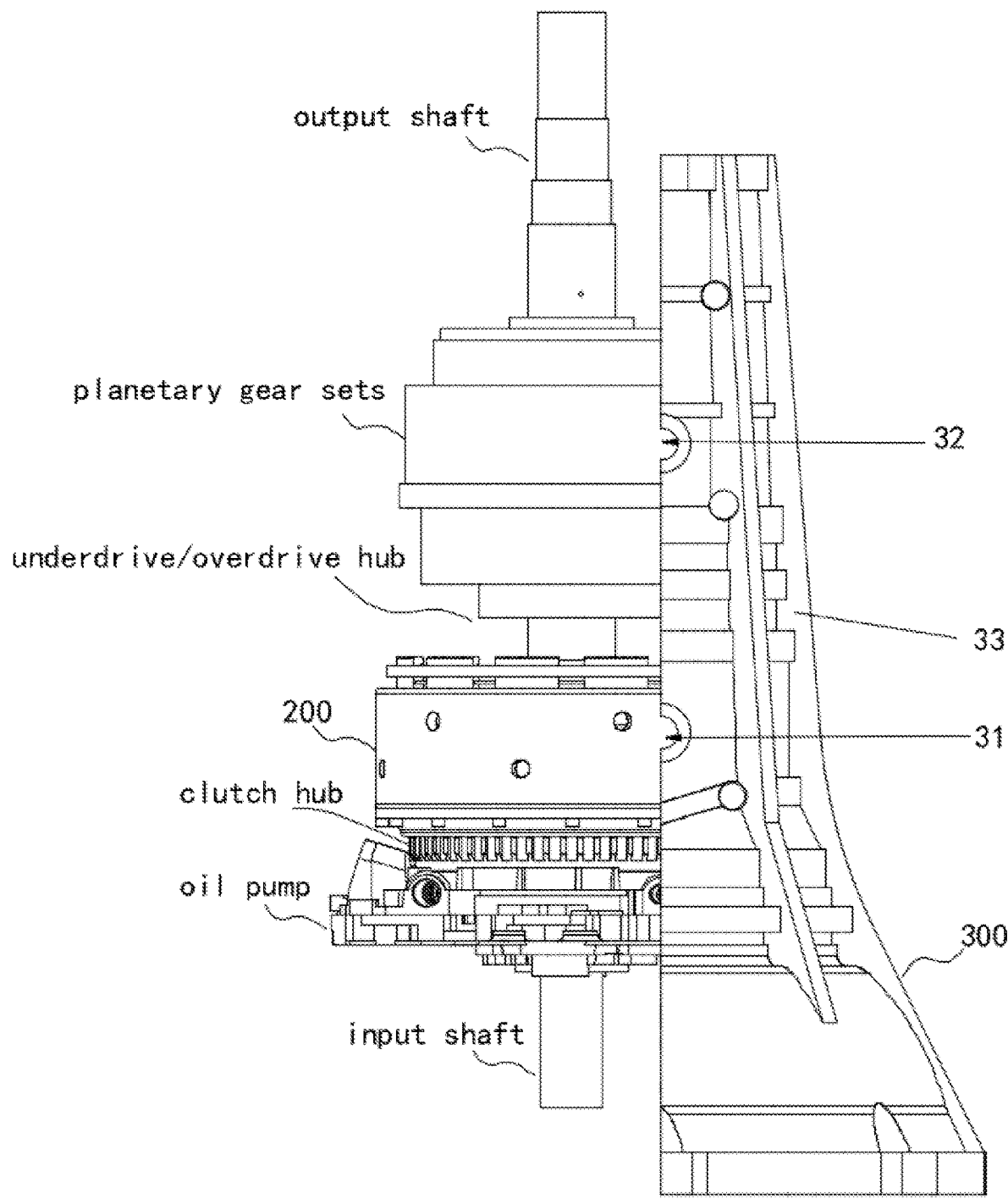
FIG. 1 is a structural schematic diagram of a transmission according to the present application (only showing one part of a transmission housing)

According to various aspects of this patent, an input drum assembly for improving performance of a 68RFE transmission, the 68RFE transmission, and a method are included. Improving the performance of the 68RFE transmission mainly includes: (1) through a new input drum assembly 200 (a retainer oil hole 222 and a piston body oil hole 272) and/or a transmission housing 300 (a housing oil filling hole 31 and a housing oil outlet hole 32), the cooling and lubricating efficiencies of the input drum assembly in the 68RFE transmission can be improved; (2) through the new input drum assembly 200 (a clutch piston 11, an overdrive hold plate 17 and a snap ring 19 replaced with a piston body cap 21, a piston body 27 and bolts 20), mounting spaces of clutch plates 14 and clutch friction discs 15 can be increased, so that thicknesses of the clutch plates 14 and the clutch friction discs 15 and the number of the clutch plates 14 and the clutch friction discs 15 can be increased, thereby finally increasing a torque borne by the 68RFE transmission; (3) a reinforcing rib 33 is added during casting of the transmission housing 300, so that the overall strength of the transmission housing can be enhanced, and the tail breakage of the original transmission housing can be avoided; (4) an inner wall corresponding to the input drum assembly 200 is cut after the transmission housing 300 is cast, so that a diameter of the input drum assembly can be increased, and diameters of the clutch plates 14 and the clutch friction discs 15 can be increased, thereby finally increasing the torque borne by the 68RFE transmission; and (5) a wall of the transmission housing 300 is provided with a speed detection hole 34 and a second speed detection hole 35, and the added second speed detection hole 35 provides a basis for lengthening an axial space of the input drum assembly 200.

By using the method or parts (the input drum assembly and the transmission housing) described herein, an existing 68RFE transmission can be improved or upgraded. In the specification, "68RFE" refers to a 68RFE transmission used in Dodge Pickup vehicles.

Figure 2:
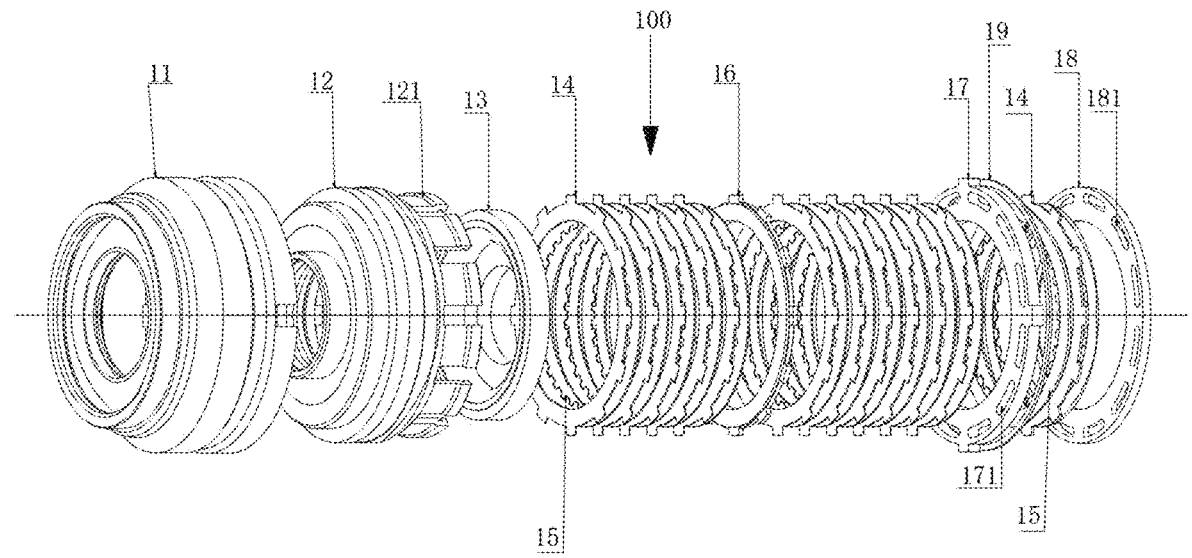
FIG. 2 is an exploded structural schematic diagram of an input drum assembly in the prior art.
Figure 3:
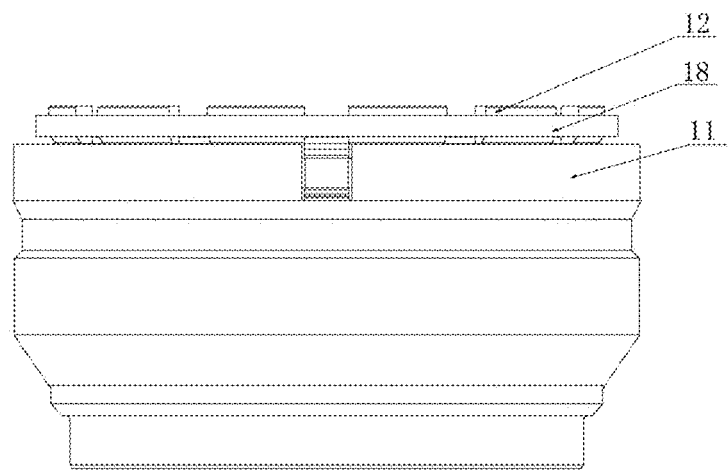
FIG. 3 is an assembling state diagram of an input drum assembly in FIG. 2.
Figure 4:
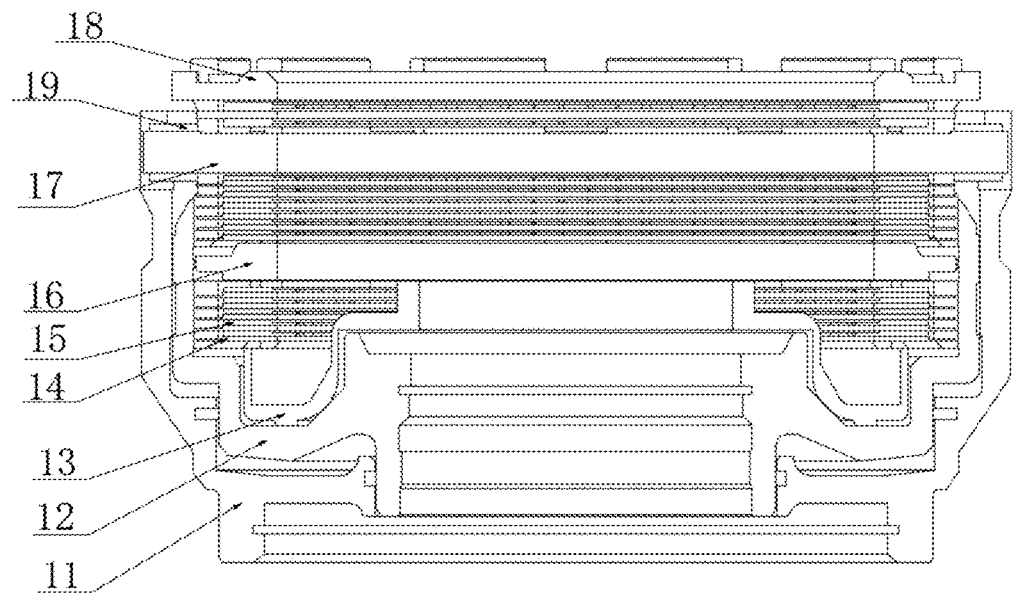
FIG. 4 is a sectional view of an input drum assembly in an assembling state in FIG. 3.
Figure 5:
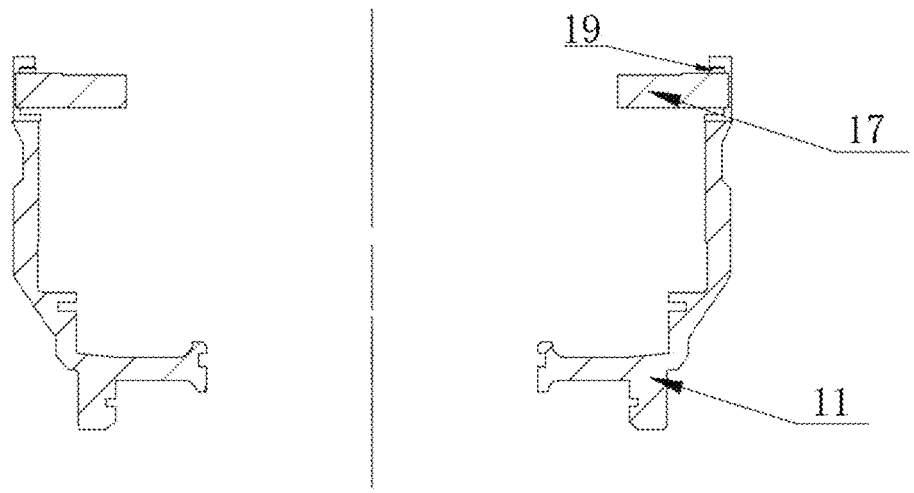
FIG. 5 is a schematic sectional view of a clutch piston, an overdrive hold plate and a snap ring of an input drum assembly in an assembling state in FIG. 2.
Figure 6:
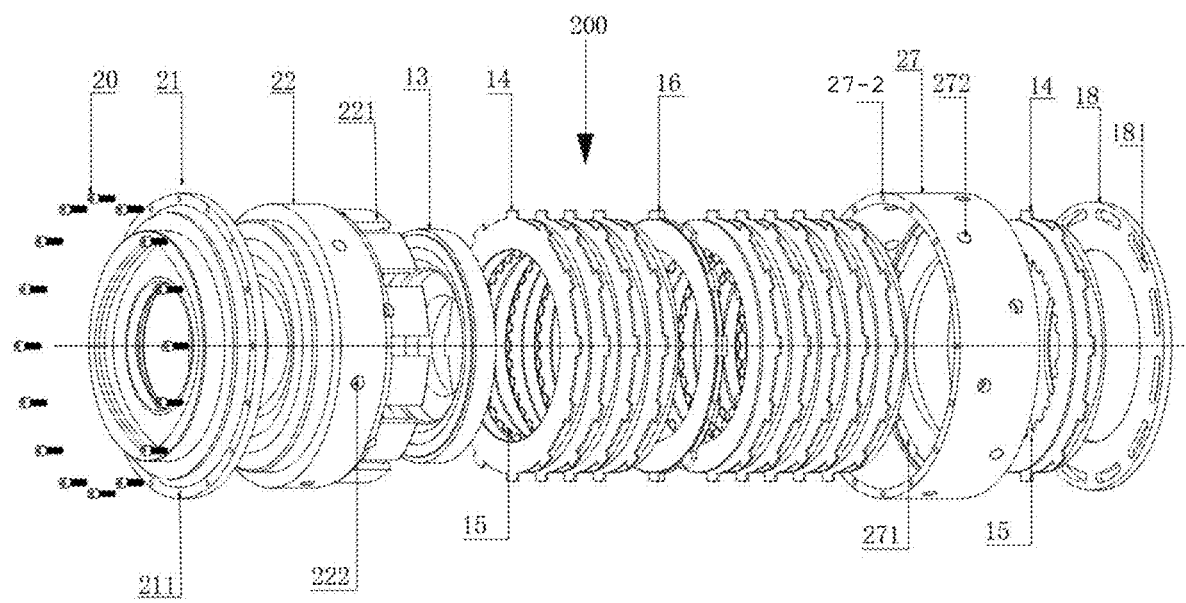
FIG. 6 is an exploded structural schematic diagram of a new input drum assembly according to the present application.
Figure 7:
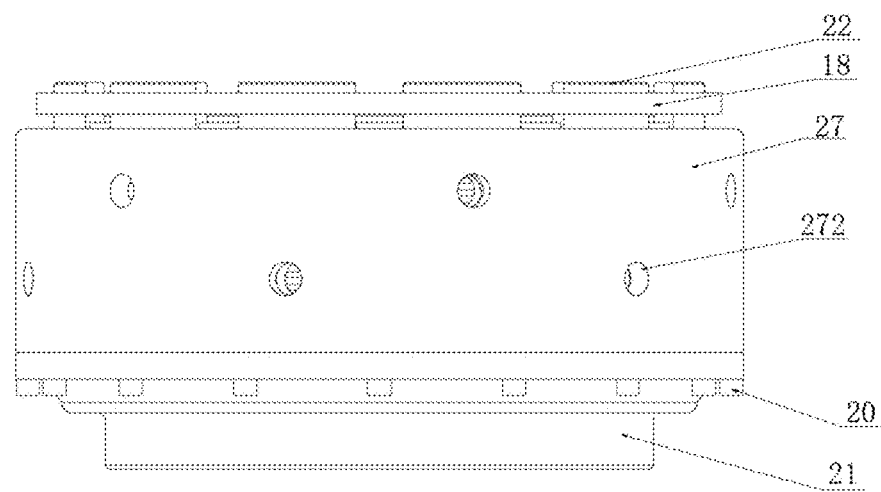
FIG. 7 is an assembling state diagram of a new input drum assembly in FIG. 6.
Figure 8:
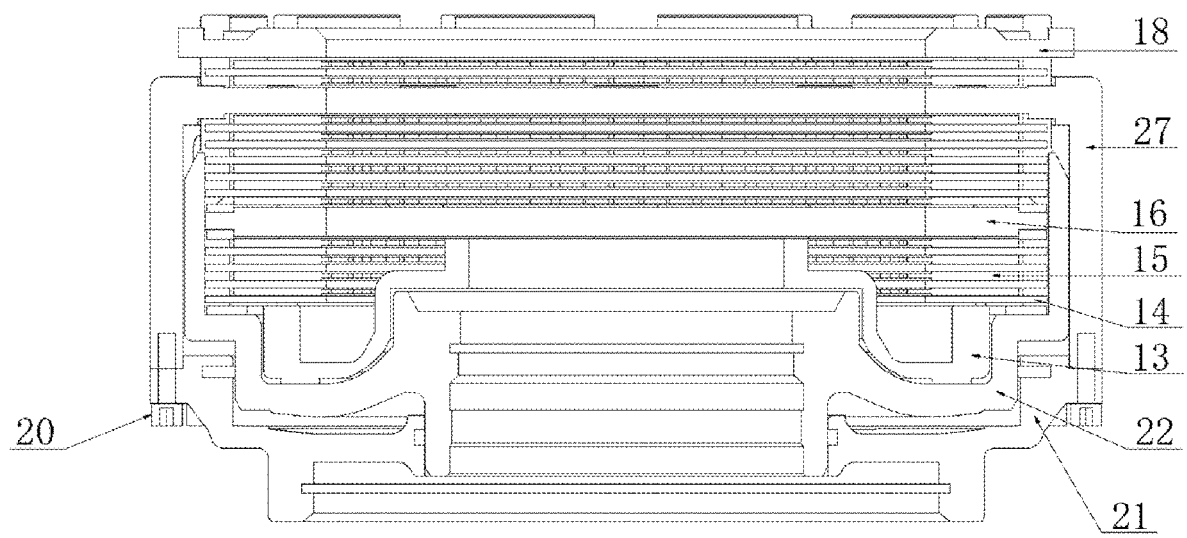
FIG. 8 is a sectional view of an input drum assembly in an assembling state in FIG. 7.
Figure 9:
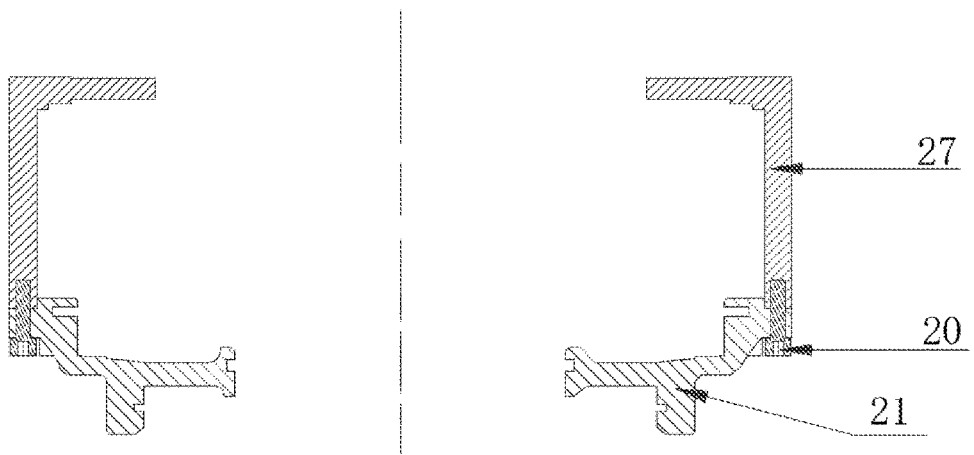
FIG. 9 is a schematic sectional view of a piston body cap, a piston body and bolts of a new input drum assembly in an assembling state in FIG. 6.

As shown in FIG. 2 and FIG. 3, in a traditional input drum assembly 100, the clutch piston 11 and the overdrive hold plate 17 are fixedly connected together through the snap ring 19, this connection mode leaves little space for the middle clutch plates 14, the clutch friction discs 15 and the underdrive hold plate 16; furthermore, the overdrive hold plate 17 with a separate structure 171 requires a sufficient thickness (the thickness is about 9 mm); therefore, it is impossible to mount more clutch plates 14 and clutch friction discs 15 to increase the friction area, so that the torque borne by the input drum assembly cannot be increased.

Figure 10:
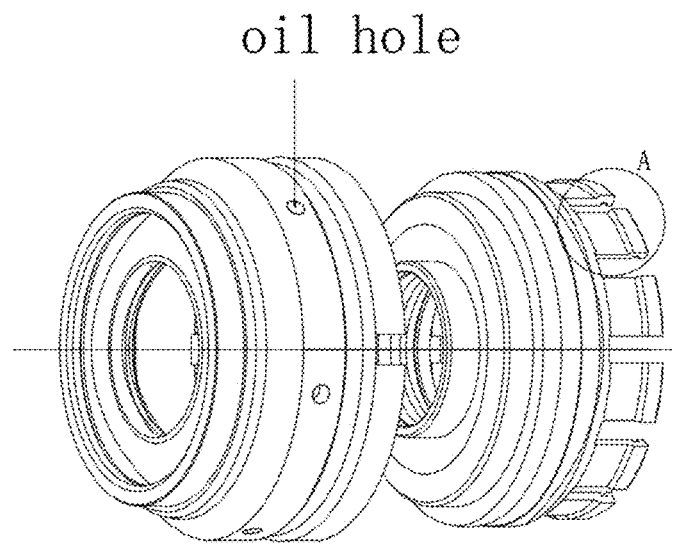
FIG. 10 is a structural schematic diagram of a clutch piston of an input drum assembly in the prior art.

In addition to the existing input drum assembly described above, in other existing designs, when the input drum assembly 100 is designed, the clutch piston 11 is provided with an oil hole (as shown in FIG. 10); however, due to the clutch retainer 12 among the clutch piston 11, the clutch plates 14 and the clutch friction discs 15, simply forming the oil hole in the clutch piston 11 cannot achieve a better heat-conducting effect.

The present application discloses an input drum assembly 200 in a 68RFE transmission for the Dodge Pickup, thereby improving the overall performance of the 68RFE transmission and prolonging the service life of the 68RFE transmission.

The improved input drum assembly according to the present application can directly replace the input drum assembly in the Dodge 68RFE transmission without making any changes to the Dodge 68RFE transmission or the housing of the transmission.

Compared with the existing input drum assembly 100 shown in FIG. 2 to FIG. 5, the improved input drum assembly 200 shown in FIG. 1 and FIG. 6 to FIG. 9 retains many assemblies in the existing input drum assembly 100, for example: the underdrive piston 13, the clutch plates 14, the clutch friction discs 15, the underdrive hold plate 16 and the clutch pressure plate 18.

As shown in FIG. 1 and FIG. 6 to FIG. 9, the improved input drum assembly 200 includes a clutch retainer 12, an underdrive piston 13, clutch plates 14, clutch friction discs 15, an underdrive hold plate 16 and a clutch pressure plate 18, and further includes a piston cap 21, a piston body 27, and bolts 20 for fixedly connecting the piston cap 21 and the piston body 27. The underdrive piston 13, the clutch plates 14, the clutch friction discs 15 and the underdrive hold plate 16 are arranged in the clutch retainer 12.

As a specific embodiment, the piston cap 21 is provided with a cap body 21-1 attached to an end face of the clutch retainer 12; an edge of the cap body 21-1 extends circumferentially to form a lip 21-2 with a certain width and thickness; and the lip 21-2 is provided with a plurality of through-holes 21-3 for the insertion of the bolts 20.

Figure 13:
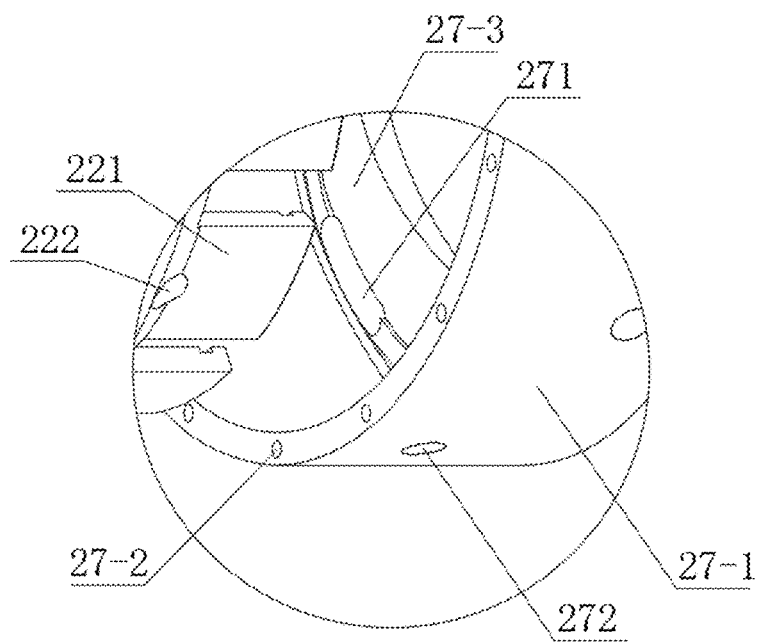
FIG. 13 is a schematic diagram of an enlarged structure of a part C in FIG. 11.
Figure 14:
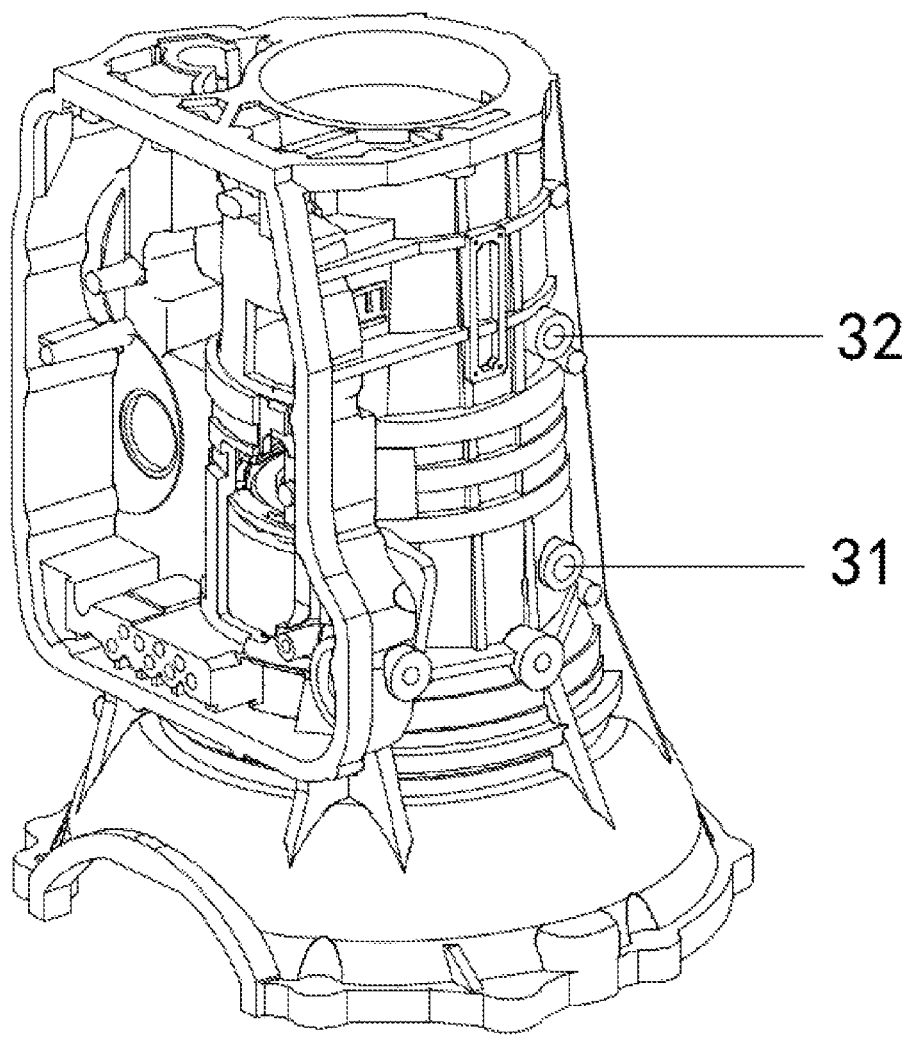
FIG. 14 is a structural schematic diagram (a stereoscopic perspective) of a new transmission housing according to the present application.

As shown in FIG. 13, the piston body 27 includes a cylindrical barrel 27-1; a plurality of hole slots 27-2 matched with the bolts 20 and the through-holes 21-3 are formed in an end face of one end of the barrel 27-1 close to the piston cap 21; a hold plate 27-3 is formed at one end of the barrel 27-1 away from the piston cap 21; and the hold plate 27-3 is provided with a piston body slot 271.

The piston cap 21 and the piston body 27 which are fixed together are sleeved outside the clutch retainer 12; meanwhile, a tab 121 on the clutch retainer 12 passes through the piston body slot 271 on the piston body 27 and is finally in clamping connection with a groove 181 on the clutch pressure plate 18. The tab 121 plays a role in positioning the piston body 27.

In the improved input drum assembly 200, the piston cap 21, the piston body 27 and the bolts 20 replace the clutch piston 11, the overdrive hold plate 17 and the snap ring 19 in the existing input drum assembly 100. In the existing input drum assembly 100, the clutch piston 11 and the overdrive hold plate 17 are fixedly connected together by the snap ring 19. Firstly, the overdrive hold plate 17 has a single split structure and is fixed with the clutch piston 11 through the snap ring 19, so it is necessary for the overdrive hold plate 17 to have great strength. Too small strength will cause deformation, such as bending, during use. Therefore, the thickness of the overdrive hold plate 17 is large necessarily (in the existing design, the thickness is about 9 mm). Secondly, the snap ring 19 is a necessary structural part, and has a certain thickness (the thickness is about 1.8 mm). In the transmission, the space for placing the input drum assembly is fixed, and the large thickness of the overdrive hold plate 17 and the thickness of the snap ring 19 will occupy the space in the thickness direction. The direct result is to reduce the number of the clutch plates 14 and the clutch friction discs 15; or on the premise of not reducing the number of the clutch plates 14 and the clutch friction discs 15, the thicknesses of the clutch plates 14 and the clutch friction discs 15 are reduced. The two cases will reduce the torque that can be borne by the input drum assembly and the service life.

In the improved input drum assembly 200, the piston body 27 with the piston body slot 271 is of an independent structure, and the piston body and the piston cap 21 are fixed through the bolts 20, so the overall strength is much greater than that of the overdrive hold plate 17 of the existing input drum assembly 100. Therefore, the thickness of the hold plate 27-3 of the piston body 27 can be reduced to ⅔ of the thickness of the overdrive hold plate 17 while the strength is maintained the same as that of the existing drum assembly 100. Meanwhile, in the improved structure of the present application, the snap ring 19 is not used. In this way, in the improved design, the mounting spaces of the clutch plates 14 and the clutch friction discs 15 are increased from 40 mm to 44.5 mm. Thus, in the improved input drum assembly 200 of the present application, on the premise of improving the integrality of parts, the axial space is saved, so more space is provided for increasing the thicknesses of the clutch plates 14 and the clutch friction discs 15 or the number of the clutch plates 14 and the clutch friction discs 15, thereby increasing the torque borne by the input drum assembly.

Figure 11:
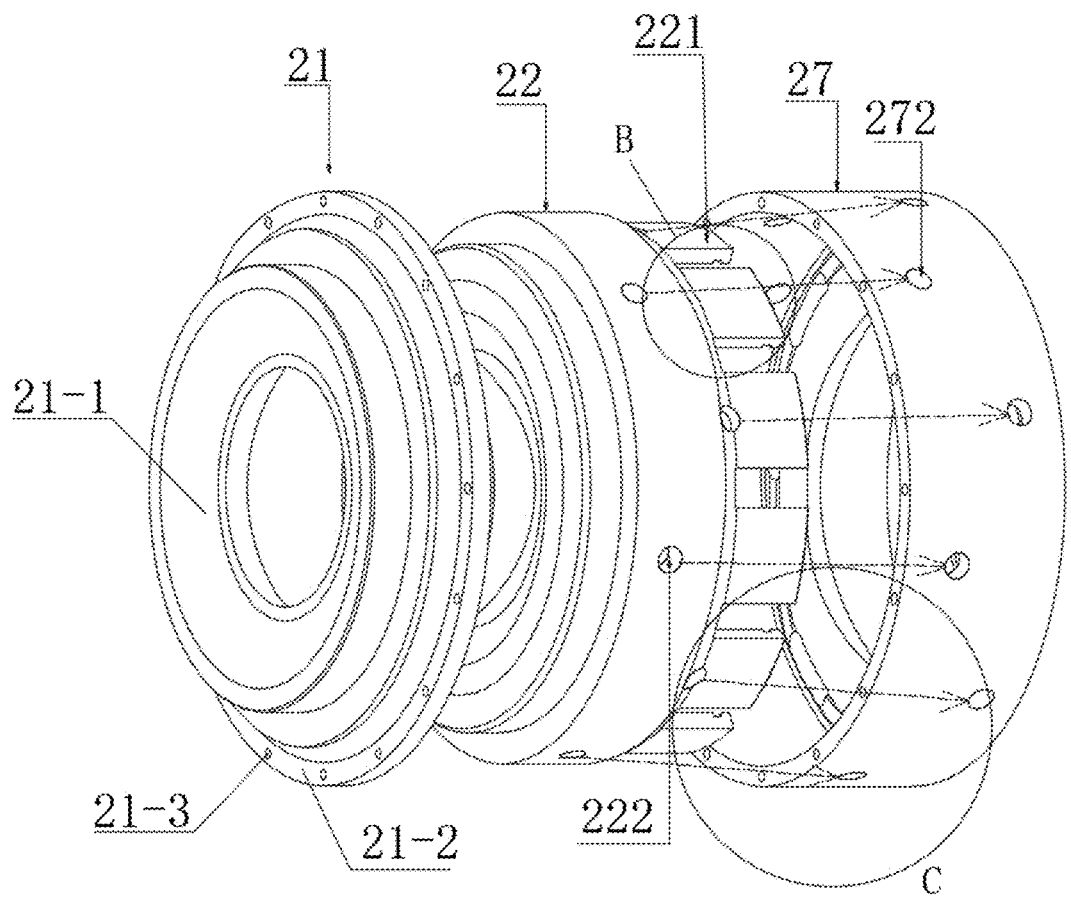
FIG. 11 is a structural schematic diagram of a piston body cap, a piston body and a clutch retainer of a new input drum assembly according to the present application.

Based on the improved input drum assembly 200, to improve the overall heat exchange efficiency of the input drum assembly 200, a wall of the barrel 27-1 of the piston body 27 is provided with a plurality of piston body oil holes 272, and through the piston body oil holes 272, parts in the input drum assembly 200 can be lubricated and cooled by lubricating oil; and the clutch retainer 12 in the traditional input drum assembly 100 constrains the internal clutch plates 14 and clutch friction discs 15, resulting in poor lubricating and heat exchange effects of the internal lubricating oil. To further improve the lubricating and cooling effects, as shown in FIG. 11, a new clutch retainer 22 is used. The new clutch retainer 22 is to form a plurality of retainer oil holes 222 on the wall of the traditional clutch retainer 12; furthermore, in the mounting state of the improved input drum assembly 200, the retainer oil holes 222 are in one-to-one correspondence with the piston body oil holes 272 (as shown in the dotted line in FIG. 11), so that the lubricating and cooling effects can be effectively improved.

Figure 12:
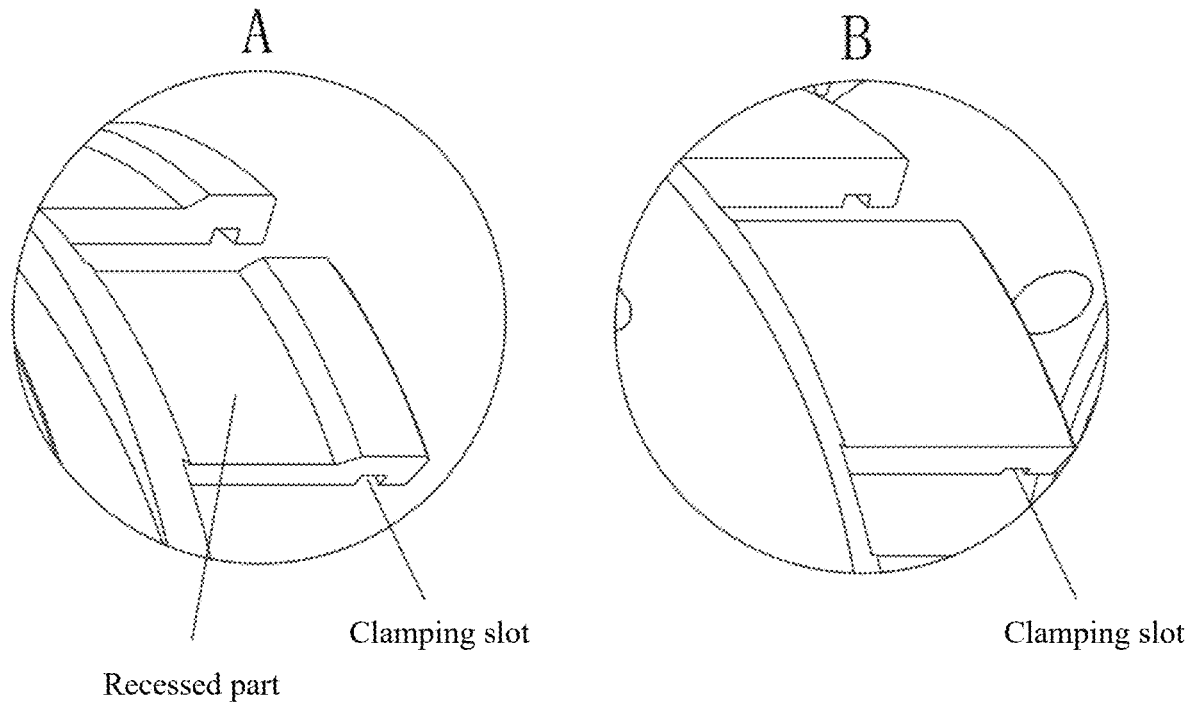
FIG. 12 is an enlarged comparison diagram of a part A in FIG. 10 and a part B in FIG. 11 (A is a clutch retainer in the prior art, and B is a clutch retainer in the present application)

As shown in FIG. 10, FIG. 11 and FIG. 12, the traditional input drum assembly 100 uses the snap ring 19 to fix the clutch piston 11 and the overdrive hold plate 17, and the snap ring 19 is required to be restrained by the tab 121 of the clutch retainer 12. Therefore, it is necessary to provide a recessed part (as shown in FIG. 12) in an outer wall of one side of the tab 121 close to the clutch retainer 12, so that the tab 121 is thinned, thereby damaging the strength of the tab 121. The improved input drum assembly 200 does not adopt the snap ring 19, so it is unnecessary to provide a recessed part on the tab. As shown in FIG. 12, FIG. 6, FIG. 11 and FIG. 13, the wall of the tab 221 on the new clutch retainer 22 has a consistent thickness (except for the position of the clamping slot), thereby enhancing the strength of the tab 221. This good technical effect is also achieved by the piston cap 21 and the piston body 27 replacing the clutch piston 11 and the overdrive hold plate 17. Actually, the new clutch retainer 22 is to add the retainer oil holes 222 based on the existing clutch retainer 12 and change the structure of the tab.

The improved input drum assembly 200 can directly replace the input drum assembly in the existing transmission to increase the number or the thicknesses of the clutch plates 14 and the clutch friction discs 15 in the transmission, thereby increasing the torque that can be borne by the transmission; meanwhile, the input drum assembly 200 is provided with the retainer oil holes 222 and the piston body oil holes 272 in a one-to-one correspondence manner, so that the lubricating and cooling effects of the transmission can be effectively improved.

The performance of the existing 68RFE transmission can be improved by the following two ways: (a) the new input drum assembly 200 is used in the 68RFE transmission; or (b) after the input drum assembly in the existing 68RFE transmission is disassembled, the clutch piston 11, the overdrive hold plate 17 and the snap ring 19 are replaced with the piston cap 21 and the piston body 27; then, the existing parts such as the underdrive piston 13, the clutch plates 14, the clutch friction discs 15 and the underdrive hold plate 16 are arranged in the clutch retainer 12 and are mounted between the piston cap 21 and the piston body 27; and finally, the piston cap 21 and the piston body 27 are fixedly connected through the bolts 20, thereby forming a new input drum assembly 200. In the method for improving the performance of the existing 68RFE transmission, it is only necessary to change the input drum assembly in the existing 68RFE transmission, or replace the clutch piston 11, the overdrive hold plate 17 and the snap ring 19 of the input drum assembly in the existing 68RFE transmission by using the bolts 20, the piston cap 21 and the piston body 27. In addition, other structures and parts in the existing 68RFE transmission are not required to be changed.

The above describes the specific structure and the technical effect of the improved input drum assembly 200. Based on the above technical solution, to further improve the lubricating and cooling effects of the transmission, the present application provides a new transmission housing 300 for replacing the existing transmission housing. Specifically, as shown in FIG. 13, under the condition of maintaining the structure of the new transmission housing 300 to have the same structure as that of the existing transmission housing, only the new transmission housing is provided with a housing oil filling hole 31 for inputting lubricating oil in the transmission housing and a housing oil outlet hole 32 for outputting the input lubricating oil from the transmission. The housing oil filling hole 31 and the housing oil outlet hole 32 are arranged to provide lubrication and heat exchange for parts in the transmission housing 300, and the arrangement is not arbitrary.

As a specific embodiment, as shown in FIG. 1, the housing oil filling hole 31 corresponds to the position of the input drum assembly 200 (specifically corresponds to the piston body 27), and the housing oil outlet hole 32 corresponds to the position of the planetary gear set arranged in the transmission housing. During use, the housing oil filling hole 31 corresponding to the input drum assembly 200 firstly fills the external lubricating oil into the transmission housing, and the flowing lubricating oil sequentially passes through the piston body oil holes 272 and the retainer oil holes 222 to enter the input drum assembly 200. In this way, the lubricating oil cools the clutch plates 14 and the clutch friction discs 15 in the input drum assembly 200. After cooling, the flowing lubricating oil flows out of the input drum assembly 200 and enters the position of the planetary gear set to lubricate the planetary gear set. Finally, the flowing lubricating oil is output from the transmission housing 300 through the housing oil outlet hole 32 corresponding to the planetary gear set. The lubricating oil is firstly input into the input drum assembly 200 because the temperature of the input drum assembly 200 is high and the lubricating oil with relatively low temperature is required to be taken away.

While the input drum assembly in the existing transmission is replaced with the improved input drum assembly 200, the transmission housing in the existing transmission is replaced by the transmission housing 300, so that the lubricating and cooling effects of the transmission can be improved to a great extent. That is, when it is necessary to upgrade or improve the existing transmission, only the input drum assembly may be replaced, or the input drum assembly and the transmission housing may be replaced at the same time.

Figure 15:
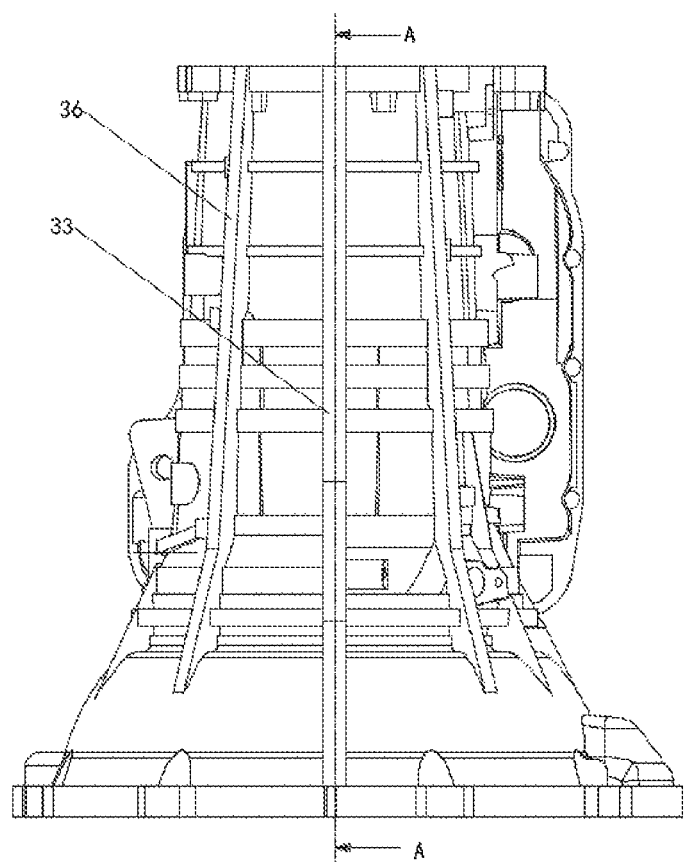
FIG. 15 is a structural schematic diagram (a front perspective) of a new transmission housing according to the present application.
Figure 16:
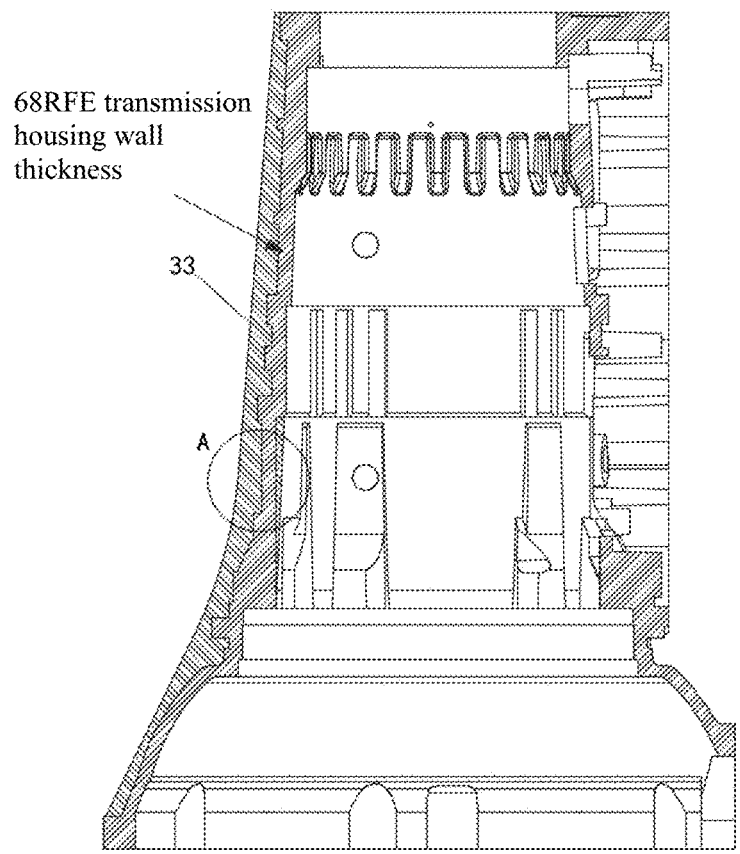
FIG. 16 is a schematic sectional view of a direction A-A in FIG. 14.

In addition to the above improvement of the transmission housing 300, as shown in FIG. 14 to FIG. 17, the present application provides other improvements for the transmission housing. The transmission housing is molded by casting (in FIG. 16, the part A and the part B are walls of the existing transmission housing, and the part indicated by the reference numeral 33 is the reinforcing rib 33 newly added in this patent). During casting, to demold successfully, an inner wall of the transmission housing is required to be inclined at a certain angle (as shown in the part B in FIG. 16), and this inclination will limit the diameter of the input drum assembly. The existing transmission housing has the minimum diameter of 210 mm and the maximum diameter of 227.7 mm at the position where the input drum assembly is accommodated, and the minimum diameter determines the maximum diameter of the input drum assembly. For this technical problem, according to the present application, after the transmission housing is cast, the inclined inner wall of the transmission housing where the input drum assembly is accommodated is cut by cutting (the part B in FIG. 16 is cut), so that the inner wall is a cylindrical surface (that is: the inner wall of the transmission housing is cylindrical at the corresponding position of the input drum assembly 200). In this way, a cylindrical inner cavity with a diameter of 227.7 mm (the inner cavity is used for accommodating the input drum assembly 200) can be formed at the position of the transmission housing where the input drum assembly is accommodated. Through this improvement, an upgraded space may be brought to the input drum assembly, and the most significant advantage is that the diameters of the clutch plates 14 and the clutch friction discs 15 can be increased. In this way, the torque that can be borne by the transmission can be further improved.

The inner wall of the transmission housing can be treated by cutting, so that the thickness of the housing wall can be reduced. Therefore, during casting, the reinforcing rib 33 penetrating up and down is cast on the outer wall of the transmission housing. The reinforcing rib 33 not only can solve this problem, but also can make the integrity of the transmission housing stronger, in particular, the transmission housing is reinforced at the position corresponding to the planetary gear set. The thickness of the wall of the existing 68RFE transmission housing at the position (the position indicated by the arrowhead in FIG. 16) corresponding to the planetary gear set is only 4 mm, so breakage is prone to occur during use. The reinforcing rib 33 may be used for reinforcing and protecting the position well. As shown in FIG. 15, in addition to the reinforcing rib 33, an auxiliary reinforcing rib 36 is arranged on the transmission housing on each of the two sides of the reinforcing rib 33; and the auxiliary reinforcing rib 36, together with the reinforcing rib 33, reinforces the tail part (the tail part refers to the upper part in FIG. 15) of the transmission housing, and the auxiliary reinforcing rib 36 is not required to penetrate through a horn mouth (that is, the lower part in FIG. 15) of the transmission housing.

Figure 17:
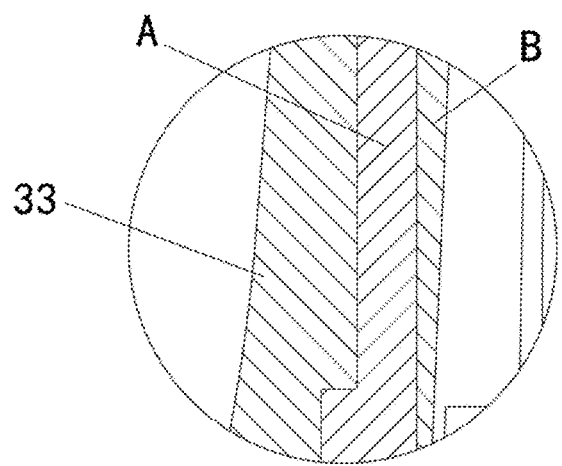
FIG. 17 is a schematic diagram of an enlarged structure of a part A in FIG. 15.
Figure 18:
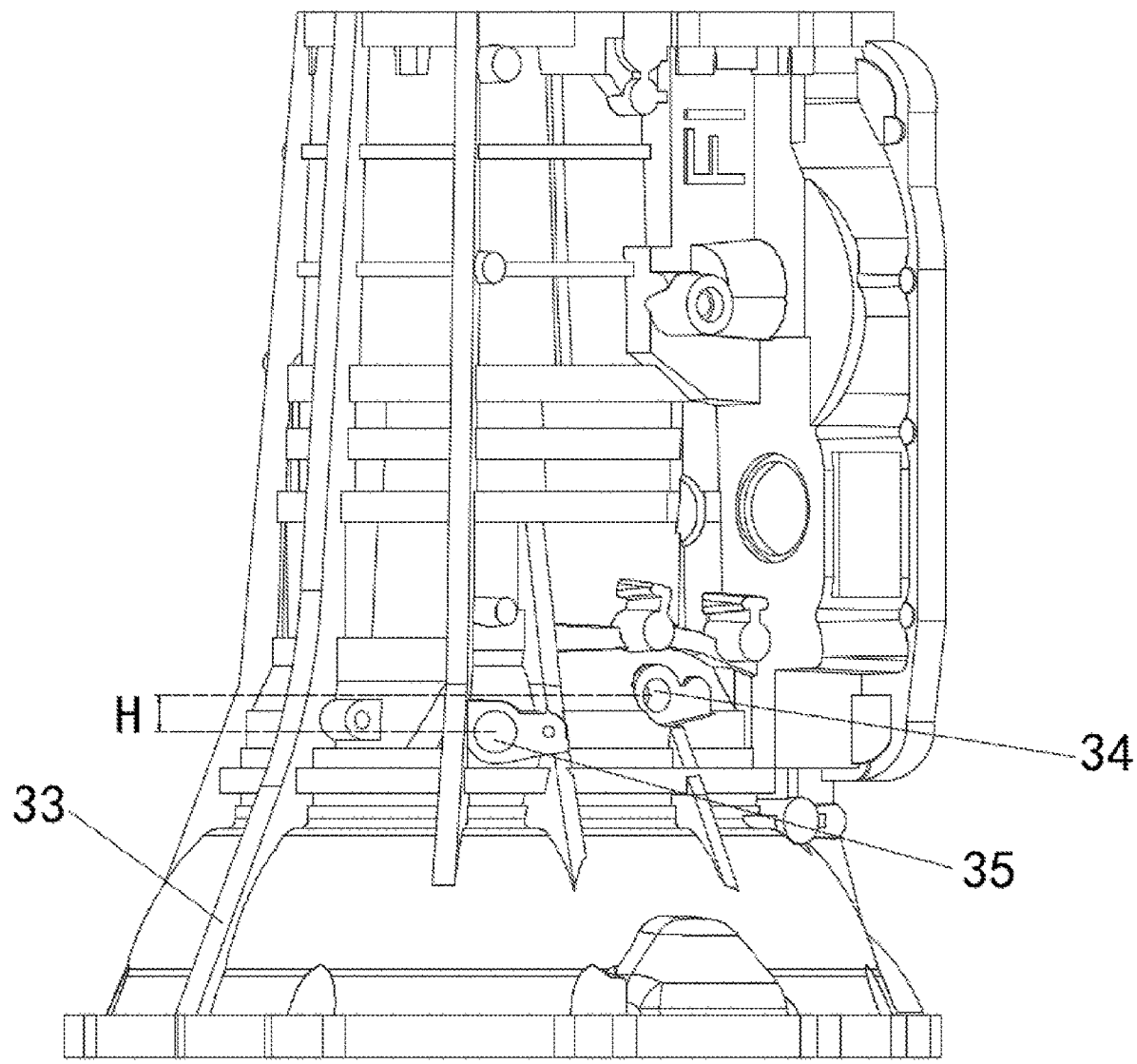
FIG. 18 is a structural schematic diagram of a new transmission housing according to the present application (showing the position of a speed detection hole).

As shown in FIG. 17, the traditional transmission housing is provided with a speed detection hole 34, and the speed detection hole 34 corresponds to the position of a clutch hub. Since the position of the speed detection hole 34 is fixed and limits the position of a speed test point, so that the axial lengthening space of the internal input drum assembly 200 can be limited, and more clutch plates 14 and clutch friction discs 15 cannot be increased. Therefore, a second speed detection hole 35 is added. Specifically, a distance between the second speed detection hole 35 in an axial direction and the planetary gear set is greater than a distance between the speed detection hole 34 and the planetary gear set. Actually, this arrangement provides a basis for assembling the clutch hub away from the planetary gear set, so that a basis is provided for lengthening the axial space of the input drum assembly 200. The axial lengthening of the input drum assembly 200 means that the number or the thickness of the clutch plates 14 and the clutch friction discs 15 mounted inside is more or larger.

The second speed detection hole 35 is arranged to provide a basis for upgrading and improvement. In a case that the speed detection hole 34 is not used and the second speed detection hole 35 is directly used, the input drum assembly 200 with a longer axial direction (the longer axial direction means that the number or the thickness of the mounted clutch plates 14 and clutch friction discs 15 is more or larger) may be used inside. A height H shown in FIG. 17 is a height difference between the speed detection hole 34 and the second speed detection hole 35, so that a larger torque can be borne, and heavier goods can be pulled.

For the transmission, it is very important to select and treat materials. In addition to the improvements on the input drum assembly of the transmission and the structure of the housing, the present application has several changes on the materials. For example, in the traditional input drum assembly, the clutch piston 11 and the clutch retainer 12 are made of aluminum alloy. To enhance the strength, an alloy steel material may be used. During die casting of the traditional transmission housing, no T6 heat treatment is performed, and the housing is brittle and has poor toughness. In the transmission housing 300, aluminum alloy A356-T6 may be used, so that the strength, the strength, toughness and impact resistance can be improved, and the overall wall thickness can be increased to 1.5-2.5 times of the traditional housing.

What is claimed is:

1. An input drum assembly for improving performance of a 68RFE transmission, comprising a clutch retainer (12), an underdrive piston (13), clutch plates (14), clutch friction discs (15), an underdrive hold plate (16) and a clutch pressure plate (18), and further comprising a piston cap (21), a piston body (27) and bolts (20) for fixedly connecting the piston cap (21) and the piston body (27), wherein the underdrive piston (13), the clutch plates (14), the clutch friction discs (15) and the underdrive hold plate (16) are arranged in the clutch retainer (12), wherein the piston cap (21) is provided with a cap body (21-1) attached to an end face of the clutch retainer (12); an edge of the cap body (21-1) extends circumferentially to form a lip (21-2) with a certain width and thickness; and the lip (21-2) is provided with a plurality of through-holes (21-3) for inserting the bolts (20); and wherein the piston body (27) comprises a cylindrical barrel (27-1); a plurality of hole slots (27-2) matched with the bolts (20) and the through-holes (21-3) are formed in an end face of one end of the barrel (27-1) close to the piston cap (21); a hold plate (27-3) is formed at one end of the barrel (27-1) away from the piston cap (21); and the hold plate is provided with a piston body slot (271).

2. The input drum assembly for improving performance of a 68RFE transmission according to claim 1, wherein the piston cap (21) and the piston body (27) which are fixed together are sleeved outside the clutch retainer (12); meanwhile, a tab (121) on the clutch retainer (12) passes through the piston body slot (271) in the piston body (27) and is finally in clamping connection with a slot (181) in the clutch pressure plate (18).

3. The input drum assembly for improving performance of a 68RFE transmission according to claim 1, wherein a plurality of piston body oil holes (272) are formed in a wall of the barrel (27-1) of the piston body (27); a plurality of retainer oil holes (222) are formed in a wall of the clutch retainer (12); and the retainer oil holes (222) are in one-to-one correspondence with the piston body oil holes (272).

4. A 68RFE transmission, comprising: a transmission housing, a planetary gear set and an input drum assembly, wherein the input drum assembly is a new input drum assembly (200), the new input drum assembly (200) comprises a clutch retainer (12), an underdrive piston (13), clutch plates (14), clutch friction discs (15), an underdrive hold plate (16) and a clutch pressure plate (18); and further comprising: a piston cap (21), a piston body (27), and bolts (20) for fixedly connecting the piston cap (21) and the piston body (27), wherein the underdrive piston (13), the clutch plates (14), the clutch friction discs (15) and the underdrive hold plate (16) are arranged in the clutch retainer (12), wherein the piston cap (21) is provided with a cap body (21-1) attached to an end face of the clutch retainer (12); an edge of the cap body (21-1) extends circumferentially to form a lip (21-2) with a certain width and thickness; and the lip (21-2) is provided with a plurality of through-holes (21-3) for inserting the bolts (20), and wherein the piston body (27) comprises a cylindrical barrel (27-1); a plurality of hole slots (27-2) matched with the bolts (20) and the through-holes (21-3) are formed in an end face of one end of the barrel (27-1) close to the piston cap (21); a hold plate (27-3) is formed at one end of the barrel (27-1) away from the piston cap (21); and the hold plate is provided with a piston body slot (271).

5. The 68RFE transmission according to claim 4, wherein the piston cap (21) and the piston body (27) which are fixed together are sleeved outside the clutch retainer (12); meanwhile, a tab (121) on the clutch retainer (12) passes through the piston body slot (271) in the piston body (27) and is finally in clamping connection with a slot (181) in the clutch pressure plate (18).

6. The 68RFE transmission according to claim 4, wherein a plurality of piston body oil holes (272) are formed in a wall of the barrel (27-1) of the piston body (27); a plurality of retainer oil holes (222) are formed in a wall of the clutch retainer (12); and the retainer oil holes (222) are in one-to-one correspondence with the piston body oil holes (272).

7. The 68RFE transmission according to claim 4, wherein a wall of the transmission housing is provided with a housing oil filling hole (31) for input lubricating oil into the transmission housing, and a housing oil outlet hole (32) for outputting the input lubricating oil from the transmission.

8. The 68RFE transmission according to claim 7, wherein the housing oil filling hole (31) corresponds to a position of the input drum assembly (200), and the housing oil outlet hole (32) corresponds to a position of the planetary gear set arranged in the transmission housing.

9. The 68RFE transmission according to claim 4, wherein a reinforcing rib (33) penetrating up and down is arranged on an outer wall of the transmission housing.

10. The 68RFE transmission according to claim 4, wherein an inner wall of the transmission housing is cylindrical at the corresponding position of the input drum assembly (200).

11. The 68RFE transmission according to claim 4, wherein a wall of the transmission housing is provided with a speed detection hole (34) and a second speed detection hole (35); and a distance between the second speed detection hole (35) in an axial direction and the planetary gear set is greater than a distance between the speed detection hole (34) and the planetary gear set.

12. A method for improving performance of a 68RFE transmission, comprising:
applying a new input drum assembly (200) in the 68RFE transmission, wherein the new input drum assembly (200) comprises a clutch retainer (12), an underdrive piston (13), clutch plates (14), clutch friction discs (15), an underdrive hold plate (16) and a clutch pressure plate (18); the new input drum assembly further comprises a piston cap (21), a piston body (27) and bolts (20) for fixedly connecting the piston cap (21) and the piston body (27); and the underdrive piston (13), the clutch plates (14), the clutch friction discs (15) and the underdrive hold plate (16) are arranged in the clutch retainer (12);
replacing a clutch piston (11), an overdrive hold plate (17) and a snap ring (19) with a piston cap (21) and a piston body (27) after the input drum assembly (200) in the 68RFE transmission is disassembled;
arranging an underdrive piston (13), clutch plates (14), clutch friction discs (15) and an underdrive hold plate (16) in a clutch retainer (12) and mounting between the piston cap (21) and the piston body (27); and
fixedly connecting the piston cap (21) and the piston body (27) by bolts (20),
wherein a wall of the new transmission housing (300) is provided with a housing oil filling hole (31) for inputting lubricating oil into the transmission housing, and a housing oil outlet hole (32) for outputting the input lubricating oil from the transmission; and
wherein a wall of the transmission housing (300) is provided with a speed detection hole (34) and a second speed detection hole (35); and a distance between the second speed detection hole (35) in an axial direction and the planetary gear set is greater than a distance between the speed detection hole (34) and the planetary gear set.

13. The method for improving performance of a 68RFE transmission according to claim 12, wherein the housing oil filling hole (31) corresponds to a position of the input drum assembly (200), and the housing oil outlet hole (32) corresponds to a position of a planetary gear set arranged in the transmission housing.

14. The method for improving performance of a 68RFE transmission according to claim 12, wherein an inner wall of the transmission housing (300) is cylindrical at the corresponding position of the input drum assembly (200).

* * * * *